United States Patent [19]
Matsumoto et al.

[11] Patent Number: 6,131,455
[45] Date of Patent: Oct. 17, 2000

[54] APPARATUS FOR MEASURING UNIFORMITY AND/OR DYNAMIC-BALANCE OF TIRE

[75] Inventors: Sigeru Matsumoto, Musashino; Kazuaki Kondo, Amagasaki, both of Japan

[73] Assignees: Nakata Engineering Kabushiki Kaisha, Hyogo-ken; Kokusai Keisokuki Kabushiki Kaisha, Tokyo, both of Japan

[21] Appl. No.: 09/212,710

[22] Filed: Dec. 16, 1998

[30] Foreign Application Priority Data

Dec. 16, 1997 [JP] Japan .................................... 9-363399
Feb. 5, 1998 [JP] Japan ................................. 10-039632
Feb. 5, 1998 [JP] Japan ................................. 10-039633

[51] Int. Cl.⁷ .................................................. G01M 1/06

[52] U.S. Cl. .................. 73/462; 73/146; 73/471

[58] Field of Search .............................. 73/146, 460, 462, 73/471

[56] References Cited

U.S. PATENT DOCUMENTS

| | | | |
|---|---|---|---|
| 4,014,139 | 3/1977 | Shooter et al. | 51/5 R |
| 4,366,707 | 1/1983 | Jarschel | 73/146 |
| 5,257,561 | 11/1993 | Folta | 82/165 |
| 5,383,361 | 1/1995 | Matumoto | 73/471 |
| 5,467,647 | 11/1995 | Schepp | 73/146 |

FOREIGN PATENT DOCUMENTS

WO 88/03866  6/1988  WIPO .

*Primary Examiner*—John E. Chapman
*Attorney, Agent, or Firm*—Pitney, Hardin, Kipp & Szuch LLP

[57] ABSTRACT

A measuring apparatus for the uniformity and the dynamic-balance of a tire is disclosed. The apparatus comprises a supporting member which is rotated with supporting a tested tire, a holding member which holds said supporting member with allowing to vibrate during rotation thereof and a regulating system which prevents the vibration of the supporting member during rotation thereof. The vibration of the supporting member is prevented by the regulating system for a uniformity measurement while it is allowed during a dynamic-balance measurement.

10 Claims, 8 Drawing Sheets

APPARATUS FOR MEASURING UNIFORMITY AND/OR DYNAMIC-BALANCE OF TIRE

BACKGROUND OF THE INVENTION

The present invention relates to a tire uniformity and/or dynamic-balance measuring apparatus.

There have been known a tire uniformity measuring apparatus which measures solely the uniformity of a tested tire and a tire dynamic-balance measuring apparatus which measures solely the dynamic balance of a tested tire.

The uniformity measuring apparatus is constituted to rotate a tire by pressing a rotating drum against the outer circumferential surface of the tire and to measure the variation of loads in the radial direction and thrust direction. The uniformity measuring apparatus must be constituted to be able to securely and firmly support the tested tire as the load applied to the tested tire by the rotating drum amounts to 100 kg or more.

On the other hand, the dynamic-balance measuring apparatus is to detect the eccentricity of the tested tire based on the state of vibration during rotation thereof. Thus, the dynamic-balance measuring apparatus is to be so constituted as to support the tested tire to be rotatable while allowing it to vibrate during rotation thereof.

Due to the above-described difference in supporting the tested tire, it has been unable to measure both the uniformity and the dynamic-balance of the tested tire by a single common measuring apparatus, and at least two independent apparatuses have been required for measuring both of them, which requires large space and expensive costs.

Furthermore, in the conventional tire uniformity measuring apparatus, a tire mounting unit can mount only one type (width) of tire although the width differs depending upon the type of a tested tire. Accordingly, it has been necessary to change a tire mounting unit depending upon the width of a tested tire, which is troublesome and cost-spending.

Moreover, in the conventional tire dynamic-balance measuring apparatus, it has been difficult to supply air to inflate a tested tire without dragging fine particles and the like therein during passing through the inside of the apparatus, which would affect on the results of measurement.

SUMMARY OF THE INVENSION

It is therefore an object of the present invention to provide an improved apparatus capable of measuring the uniformity and/or the dynamic-balance of a tested tire therewith.

Another object of the present invention is to provide a measuring apparatus capable of carrying out a uniformity measurement without changing a tire mounting unit despite the width of a tested tire.

Other object of the present invention is to provide a measuring apparatus capable of supplying air through inside of the apparatus to inflate a tested tire without dragging fine particles and the like therein.

In one aspect of the present invention, there is provided a measuring apparatus for the uniformity and/or the dynamic-balance of a tire, which comprises: a supporting member which is rotated with supporting a tested tire; a holding member which holds the supporting member with allowing to vibrate during rotation thereof; and a regulating system which prevents the vibration of the supporting member during rotation thereof, and wherein the vibration of the supporting member is prevented by the regulating system during a uniformity measurement.

With thus constituted measuring apparatus, the spindle holding a tested tire can vibrate during rotation thereof for the dynamic-balance measurement, while the vibration of the spindle is prevented during rotation thereof for the uniformity measurement, which enables to measure both the dynamic-balance and the uniformity of a tested tire by a single apparatus.

When the uniformity measurement is carried out, a rotary drum is pressed against the circumferential surface of the tested tire.

In the embodiment, the holding member comprises a housing which rotatably holds the supporting member, and a plurality of elastic members provided between the housing and a frame member for supporting the housing.

Further, the regulating system comprises a coupling member supported by the frame member to be movable between operative and inoperative positions, and the coupling member firmly couples the housing to the frame member at the operative position when the coupling member is moved to the operative position during a uniformity measurement.

The regulating system may further comprise a rotatable shaft member supported by the frame member and disposed on the extension of the rotary axis of the supporting member, and a chuck mechanism provided at one end of said rotatable shaft member for chucking the supporting member at the side opposite to the holding member across the tire. The chuck mechanism chucks the supporting member during a uniformity measurment so as to connect the supporting member to the rotatable shaft member.

Moreover, the supporting member comprises a rotatable spindle having a first rim and an axially extending hollow portion, a locking shaft having a second rim and inserted into the hollow portion of the spindle so that the tested tire is pinched between the first and second rims, and a locking system which firmly locks the locking shaft to the rotatable spindle. The axial distance between the first and second rims is changed by shifting the position of the locking shaft relative to the rotatable spindle to be locked by the locking system.

The locking system may comprise a plurality of engaging steps formed on the outer circumferential surface of the locking shaft and arranged in the axial direction thereof, and at least one lock member provided on the spindle to be movable in the direction perpendicular to the axial direction of the spindle. The lock member is provided with engaging steps to be meshed with the engaging steps of the locking shaft to lock the locking shaft to the spindle when the lock member is moved to abut against the locking shaft.

Optionally, a plurarity of lock members may be provided and arranged radially at the interval of a predetermined angle about the axis of the spindle.

Furthermore, an air passage system is provided in the spindle for supplying air into the tire held between the first and second rims, and is formed to be isolated from the portion of the spindle where the lock shaft is to be inserted and from the locking system. The air passage may be formed to pass the intervals among a plurality of lock members.

In another aspect of the present invention, there is provided a measuring apparatus for the uniformity of a tire, which comprises a rotatable spindle having a first rim and an axially extending hollow portion, a locking shaft having a second rim and inserted into the hollow portion of the spindle so that the tested tire is pinched between the first and second rims, a locking system which firmly locks the locking shaft to the rotatable spindle, the axial distance between the first and second rims being changed by shifting the position of the locking shaft relative to the rotatable spindle to be locked by said locking system, and a rotary drum arranged to be pressed against the circumferential surface of the tested tire.

With thus constituting, it becomes unnecessary to change a tire mounting unit, as required in the conventional one, depending upon the width of a tested tire for a uniformity measurement.

The locking system may comprise a plurality of engaging steps formed on the outer circumferential surface of the locking shaft and arranged in the axial direction thereof, and at least one lock member provided on the spindle to be movable in the direction perpendicular to the axial direction of the spindle, the lock member being provided with engaging steps to be meshed with the engaging steps of the locking shaft to lock the locking shaft to the spindle when the lock member is moved to abut against the locking shaft.

Optionally, a plurarity of lock members may be provided and arranged radially at the interval of a predetermined angle about the axis of the spindle.

In other aspect of the present invention, there is provided a measuring apparatus for the dynamic-balance of a tire, which comprises a rotatable spindle having a first rim and an axially extending hollow portion, a locking shaft having a second rim and inserted into the hollow portion of the spindle so that the tested tire is pinched between the first and second rims, a locking system which firmly locks the locking shaft to the rotatable spindle, the axial distance between the first and second rims being changed by shifting the position of the locking shaft relative to the rotatable spindle to be locked by the locking system, and an air passage system provided in the spindle for supplying air into the tire held between the first and second rims, and is formed to be isolated from the portion of the spindle where the lock shaft is to be inserted and from the locking system.

With thus constituting, it can be prevented for air supplied to inflate a tested tire to drag fine particles and the like therein during passing through inside of the apparatus.

The locking system may comprise a plurality of engaging steps formed on the outer circumferential surface of the locking shaft and arranged in the axial direction thereof, and a plurarity of lock members are provided and arranged radially at the interval of a predetermined angle about the axis of the spindle, each of the lock members being movable in the direction perpendicular to the axial direction of the spindle, and being provided with engaging steps to be meshed with the engaging steps of the locking shaft to lock the locking shaft to the spindle when the lock member is moved to abut against the locking shaft, and wherein the air passage system is formed to pass the intervals among the plurarity of lock members.

DESCRIPTION OF THE ACCOMPANYING DRAWINGS

DESCRIPTION OF THE PREFERRED EMBODIMENTS

A measuring apparatus for uniformity and/or dynamic-balance of a tire, which embodies the present invention, will be described hereinafter with reference to the accompanying drawings.

Figure 1:
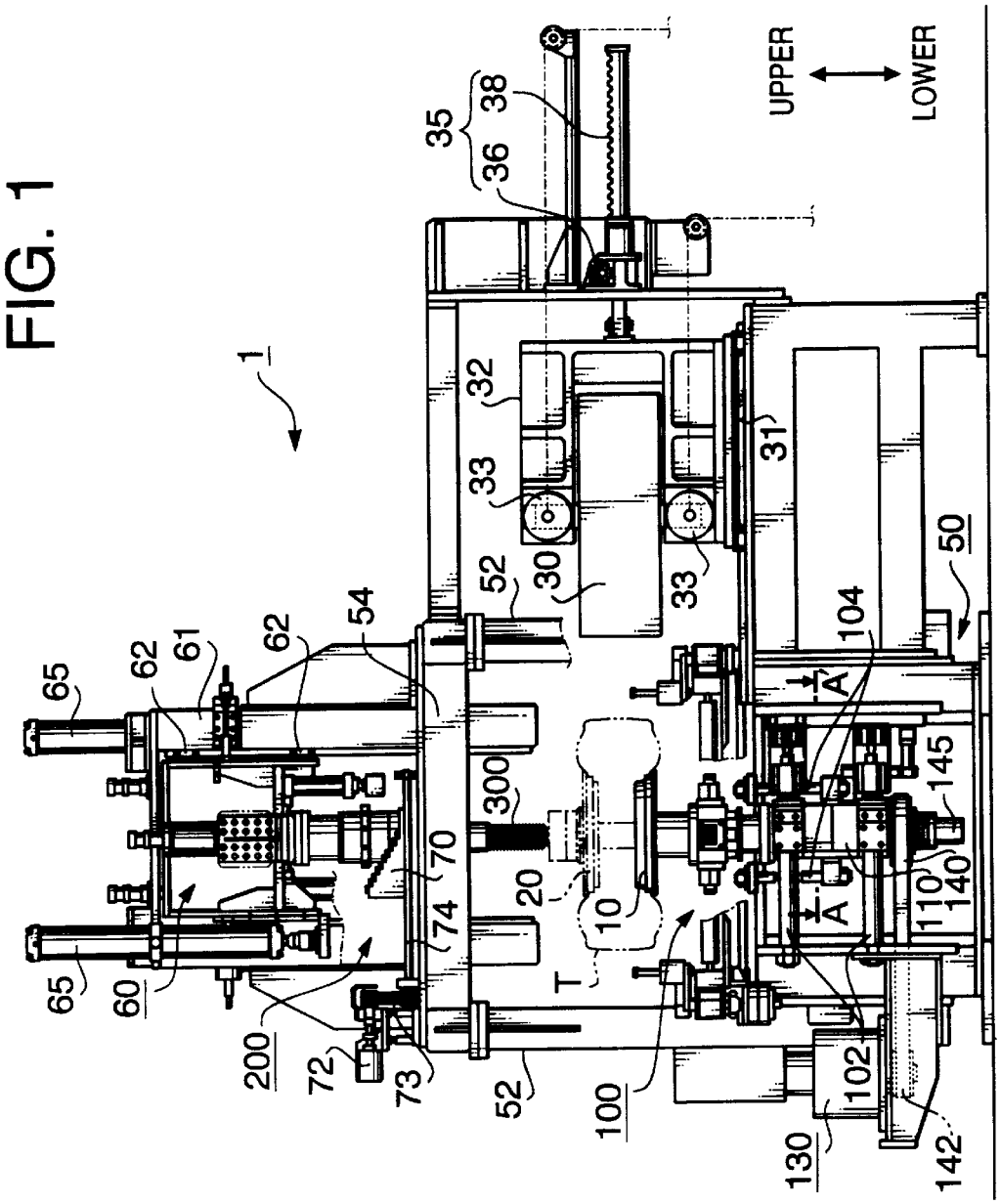
FIG. 1 is a front view of a compound measuring apparatus embodying the invention.
Figure 2:
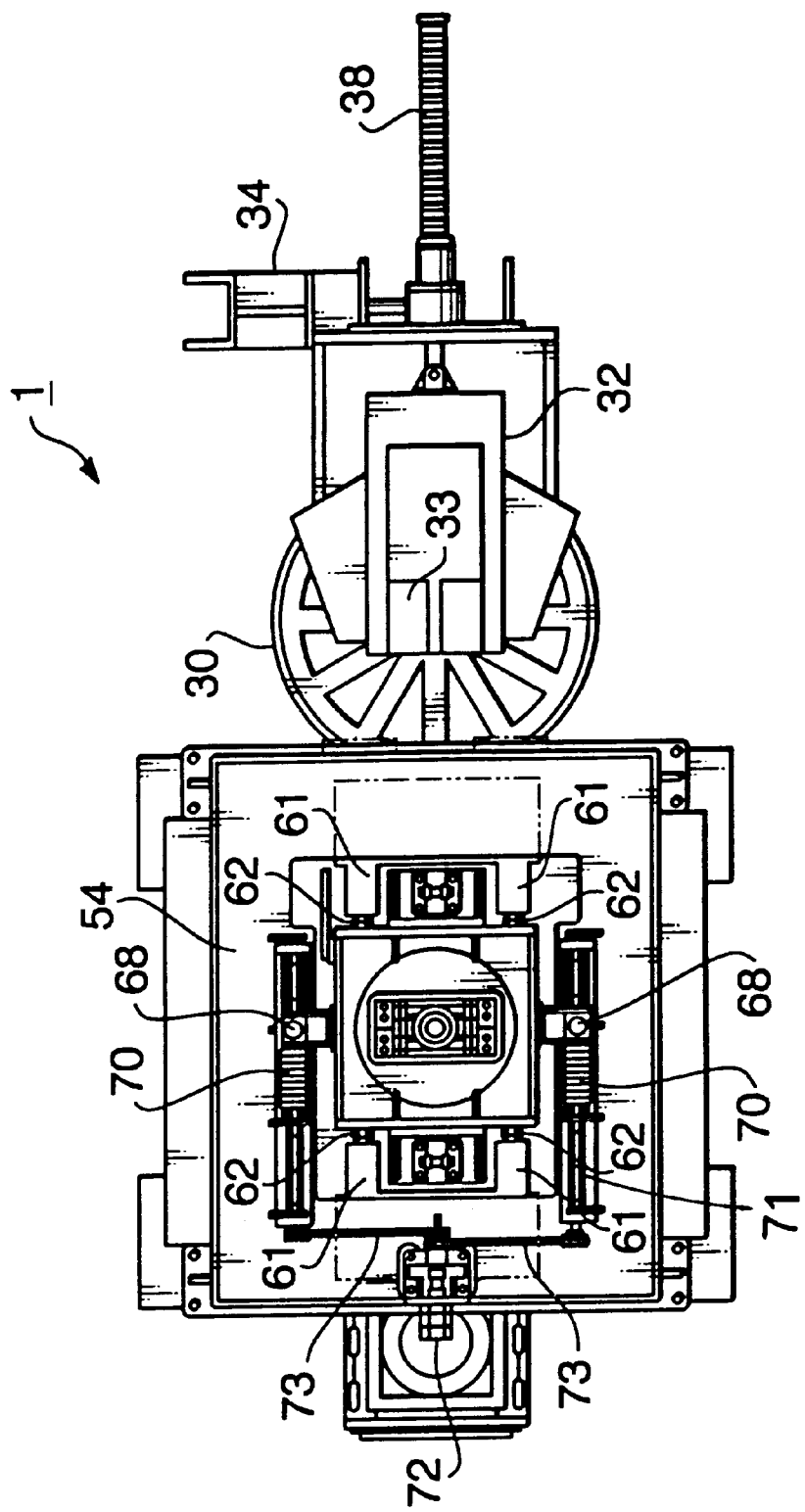
FIG. 2 is a plan view of the measuring apparatus shown in FIG. 1.

FIGS. 1 and 2 are a front and a plan views, respectively, showing the basic constitution of a measuring apparatus 1. In the following description, the "up" and "down" are defined as indicated in FIG. 1. It should be noted, however, the measuring apparatus 1 may be vertically inversely constituted or horizontally arranged instead of the disclosed one.

The frame of the measuring apparatus 1 comprises a base 50, struts 52 extending upward from the base 50, and a roof 54 supported by the struts 52. A spindle 100 is mounted on the base 50 to hold and rotate a tested tire T.

Figure 3:
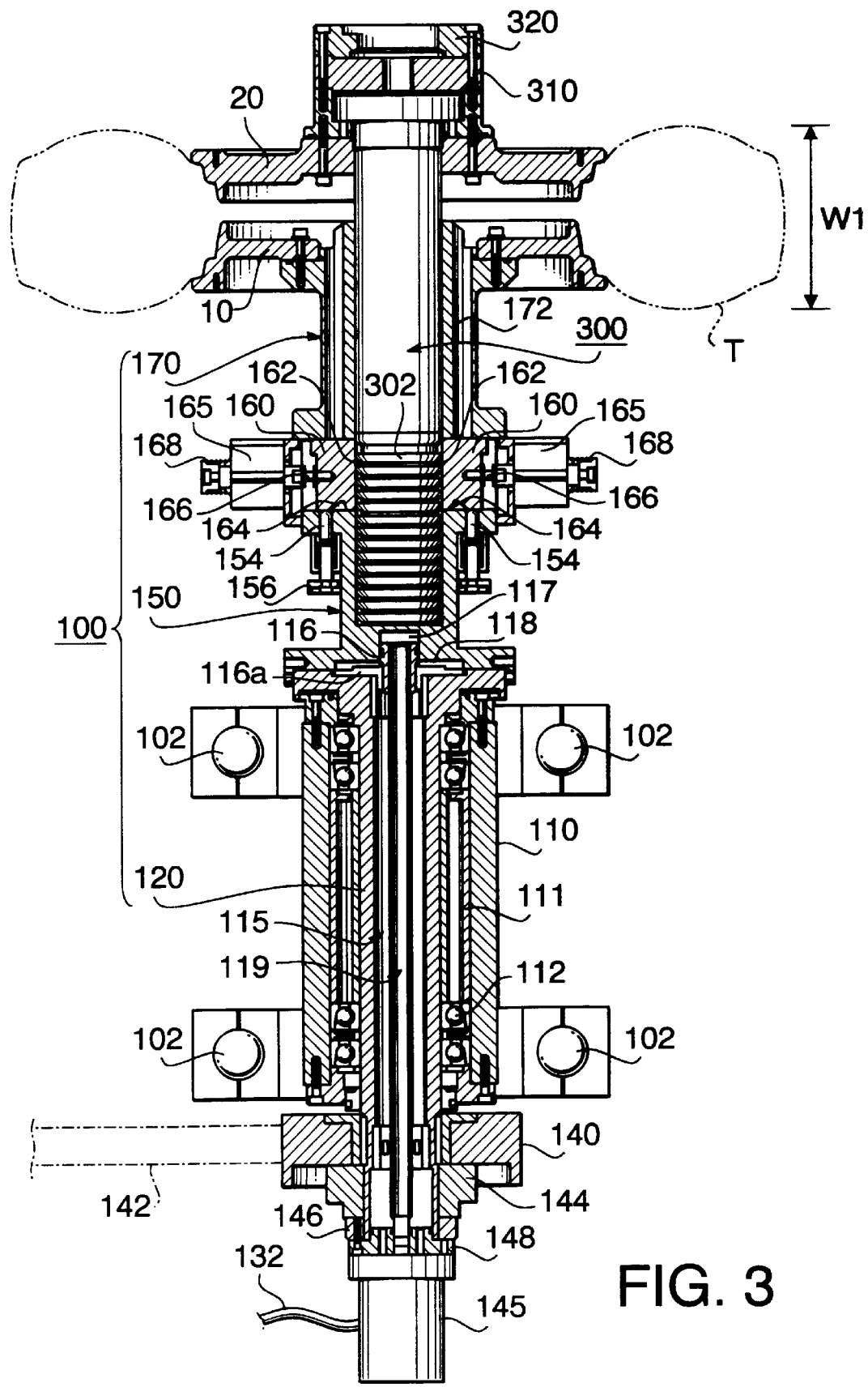
FIG. 3 is a side sectional view of a spindle unit portion of the measuring apparatus shown in FIG. 1.

First, a tested tire supporting system will be described by referring to FIG. 3. FIG. 3 is a side sectional view of the spindle portion of the apparatus shown in FIG. 1. A tested tire T is sandwiched and held between a pair of rims 10 and 20, which will be described later.

The spindle 100 is, as shown in FIG. 3, constituted by a hollow spindle shaft 120, a bracket 150, and a hollow shaft 170, which are vertically and coaxially connected in this order.

The spindle shaft 120 is rotatably supported by a spindle housing 110 via bearings 112. The spindle housing 110 is mounted on the base 50 (see FIG. 1) via four horizontal bar springs 102.

The lower rim 10 is attached to the upper end of the hollow shaft 170 of the spindle 100. By inserting a lock shaft 300 with the upper rim 20 fixed thereto, into the bracket 150 through the hollow shaft 170, the tire T can be sandwiched and held between the lower and upper rims 10 and 20 as illustrated in FIG. 3.

A pulley 140 for rotationally driving the spindle shaft 120 is mounted at the lower end of the spindle shaft 120. An endless belt 142 is passed around the pulley 140 so that the pulley 142 is rotationally driven via the endless belt 142 by a spindle driving motor 130 which is fixed to the base 50. That is, when the spindle driving motor 130 is driven, the spindle 100 is rotated with the tire T held between the lower and upper rims 10 and 20.

Figure 4:
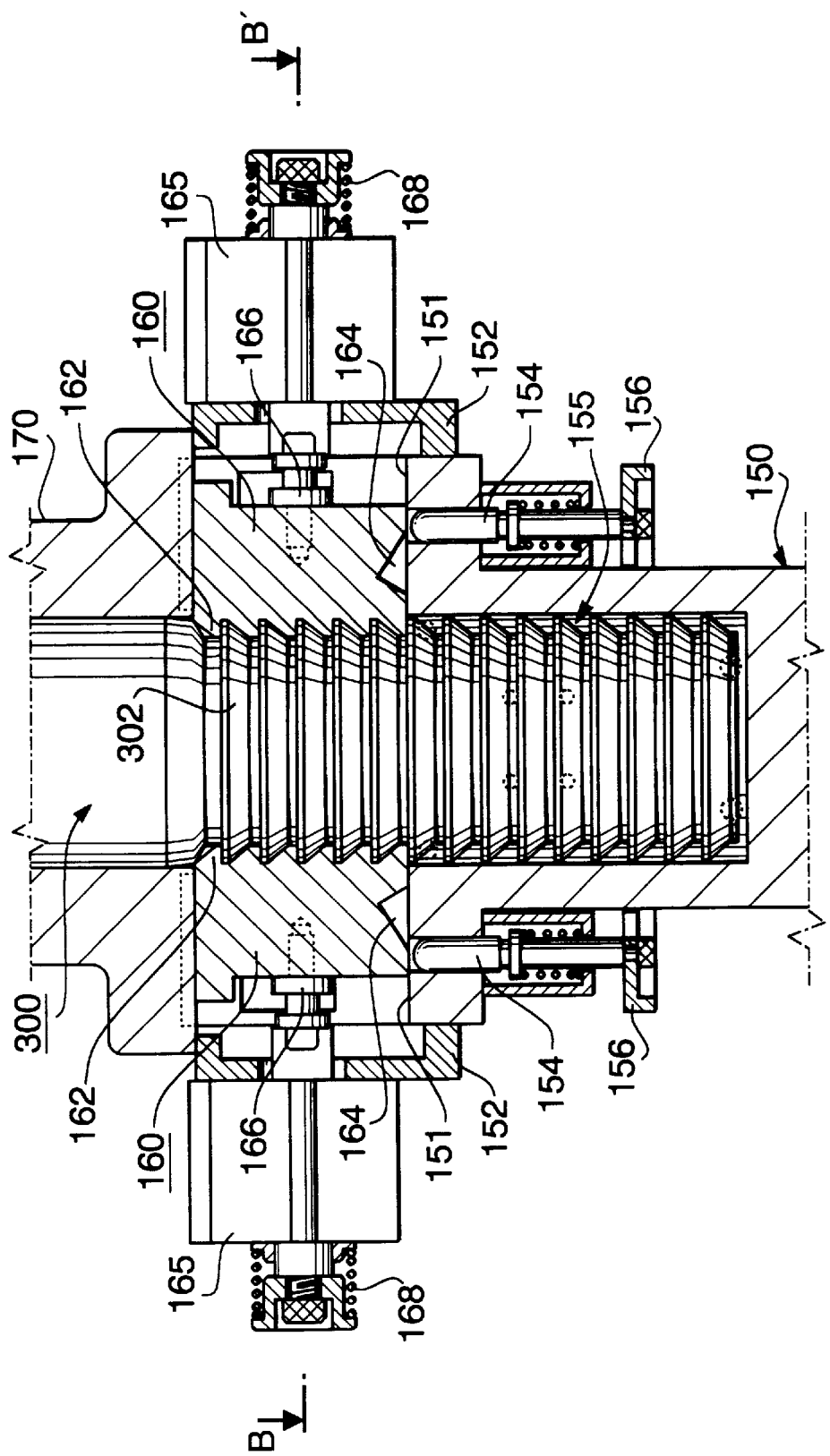
FIG. 4 is an enlarged view of a bracket area of the spindle unit portion shown in FIG. 3.
Figure 5:
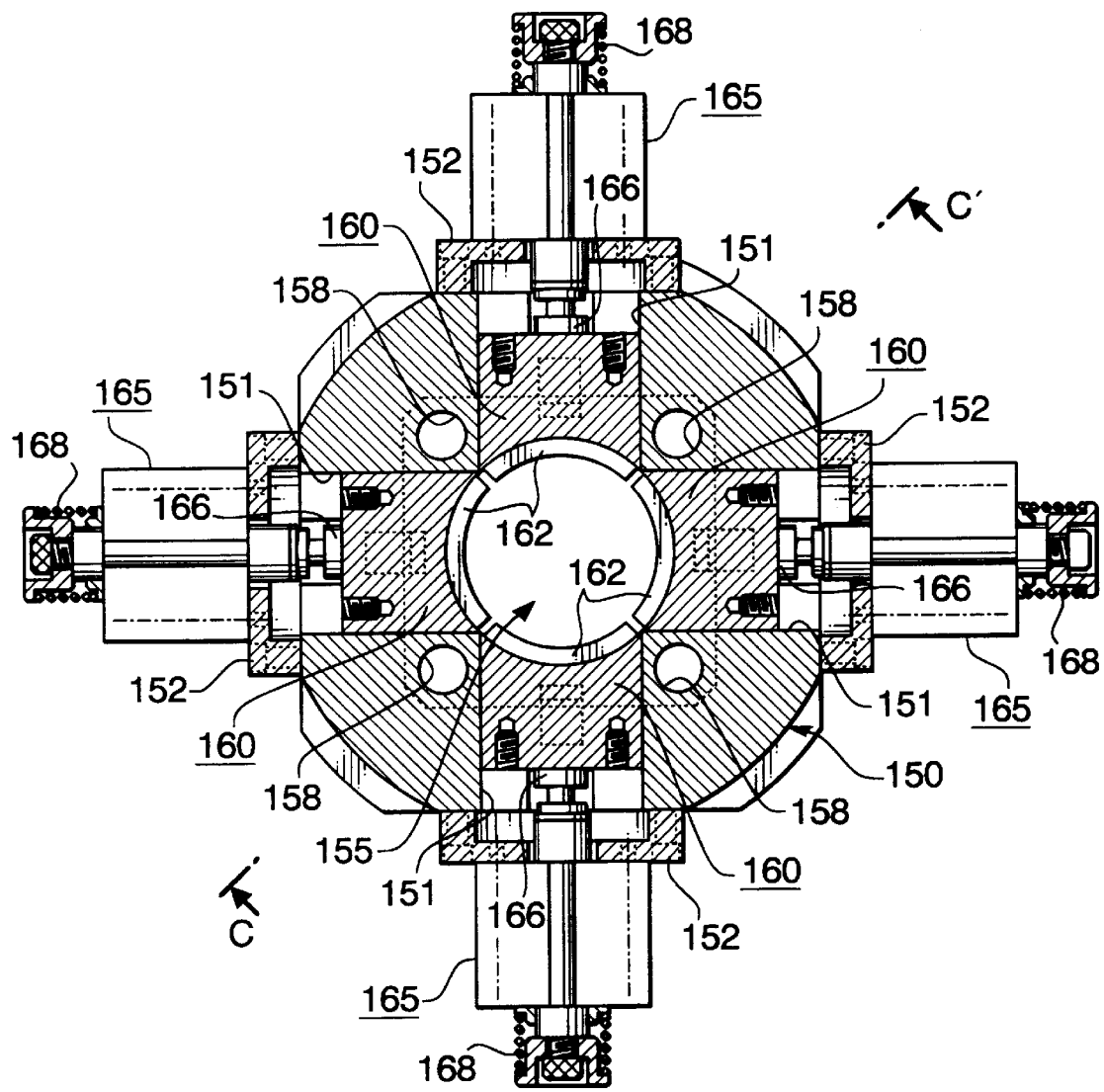
FIG. 5 is a sectional view taken along the line B–B' in FIG. 4 for illustraing a bracket structure.

FIG. 4 is a side sectional view of the bracket 150 into which the lock shaft 300 is inserted. FIG. 5 is a sectional view taken along the line B–B' of FIG. 4 (the lock shaft is omitted). At the outer periphery of the lower part of the lock shaft 300, fifteen-step lock grooves 302 are arranged vertically. The bracket 150 is provided with lock members 160 opposed to the outer peripheral surface of the lock shaft 300. Each lock member 160 has six-step lock claws 162 arranged vertically, and these lock claws 162 engage with the lock grooves 302 of the lock shaft 300.

As shown in FIG. 5, four lock members 160 are provided radially with respect to the center of the bracket 150 at intervals of 90°, and the lock claws 162 of each of the lock members 160 project into a lock shaft insertion portion 155 in which the lock shaft 300 is to be inserted. The lock members 160 are slidably held in four sliding grooves 151 formed in the bracket 150 so as to be capable of moving in the directions to engage with and to be released from the lock shaft 300.

A locking cylinder 165 for driving each lock member 160 is mounted to the outer peripheral end of the bracket 150 via a holding member 152. The lock member 160 is secured to the tip end portion of a plunger 166 of the locking cylinder 165. The plunger 166 is urged in the direction to be away from the lock shaft 300 by a spring 168. That is, the lock member 160 is urged in the direction to be disengaged from the lock shaft 300.

The air for driving the locking cylinder 165 is supplied through an air passage branching from a later-described air supply system. When the locking cylinder 165 is made operative, the lock claws 162 of the locking member 160 engage with the lock grooves 302 of the lock shaft 300, and when the locking cylinder 165 is made inoperative, the lock member 160 is moved so that the lock claws 162 are disengaged from the lock grooves 302.

As above constituted, by inserting the lock shaft 300 into the bracket 150 of the spindle 100 through the hollow shaft 170, and making the locking cylinders 165 operative, the tire T can be surely retained between the lower rim 10 and the upper rim 20. On the contrary, by making the locking cylinder 160 inoperative, the lock shaft 300 becomes free and can be pulled out of the spindle 100, thereby the tire T is able to be removed from between the lower rim 10 and the upper rim 20.

As shown in FIGS. 4 and 5, the bracket 150 is provided with pins 154, respective one of which is arranged to be vertically moved following the horizontal movement of the corresponding lock member 160. That is, the pin 154 is spring-biased to protrude above the surface along which the lock member 160 slides, and is pressed against a concave portion 164 formed at the bottom surface of the lock member 160. Upon horizontal movement of the lock member 160, the pin 154 is guided up and down in accordance with the configuration of the concave portion 164. Thus, by detecting the vertical position of a disk 156 which is fixed to the lower end of the pin 154 by means of a positional sensor (not shown), it can be discriminated whether the lock member 160 is at the lock position where the lock member 160 engages with the lock shaft 300 or at the release position where the lock member 160 is separated/disengaged from the lock shaft 300.

Hereafter, air supply system for blowing air into the tire T held between the rim 10 and the rim 20 will be described.

As shown in FIG. 3, the spindle shaft 120 is a hollow shaft member, and within its hollow portion 115, there is provided an air pipe 119 for axially extending through the hollow portion 115. The upper end portion of the air pipe 119 is fixed to the upper end of the spindle shaft 120 through a flange 116. Into the hollow portion 115 and the air pipe 119, air is fed from a rotary joint 145 provided at the lower end of the spindle shaft 120. An air hose 132 for supplying air from an air source (not shown) is connected to the rotary joint 145.

The interior of the hollow portion 115 (i.e., outside of the air pipe 119) is used as an air passage for carrying air which inflates the tire T, and the inside of the air pipe 119 is used as an air passage for carrying air for driving the locking cylinder 165.

Figure 6:
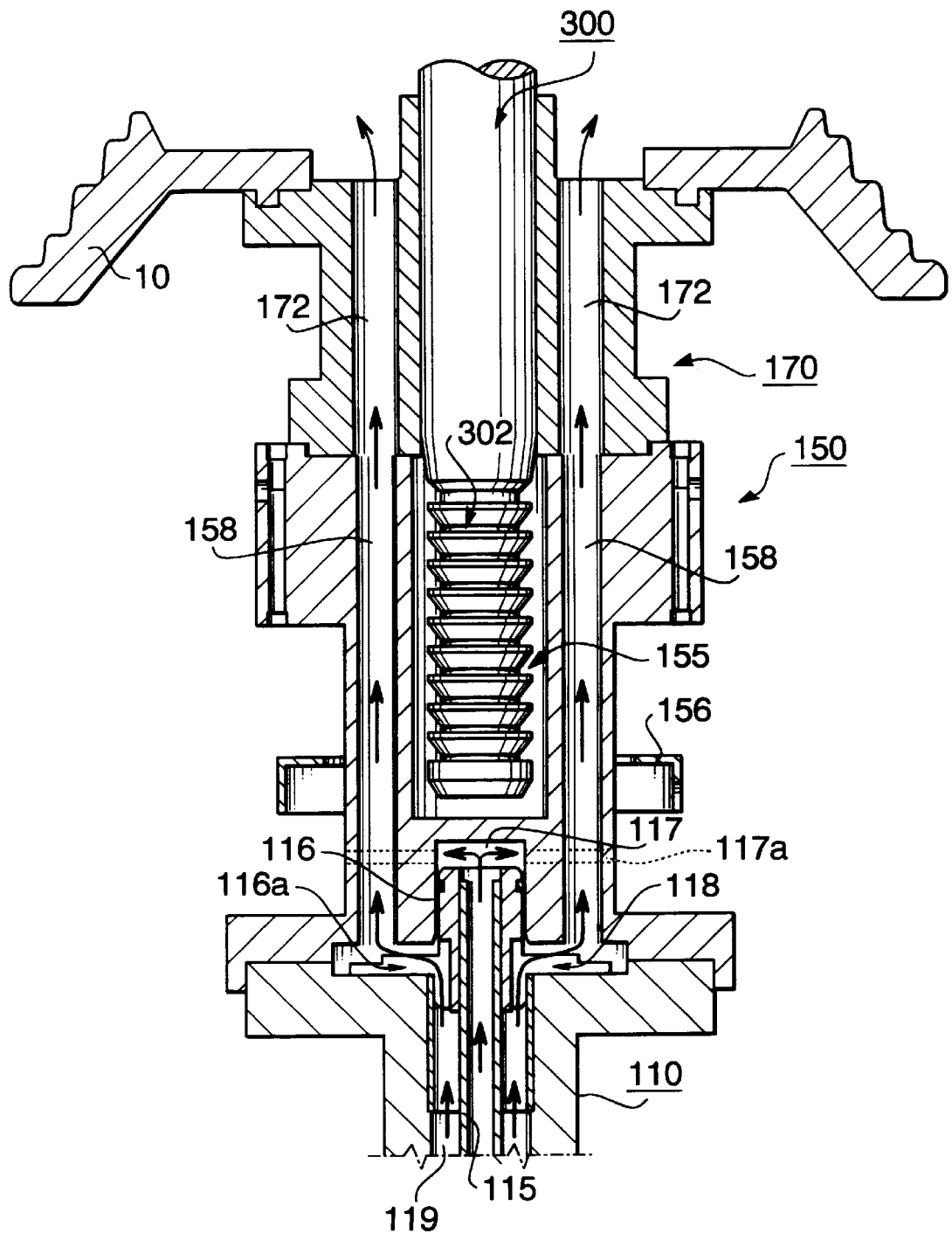
FIG. 6 is a sectional view taken along the line C–C' in FIG. 5 for illustrating an air passage structure.

FIG. 6 is a sectional view taken along the line C–C' in FIG. 5 for illustrating an air passage structure. As shown in FIG. 6, the air fed from the rotary joint 145 through the outside of the air pipe 119 passes through slit portion 116a formed in the flange 116, and reaches a cavity 118 formed at the bottom of the bracket 150. This cavity 118 is connected to first air passages 158.

As seen from FIGS. 5 and 6, four of the first air passages 158 are formed in the bracket 150. The first air passages 158 are arranged radially with respect to the axis of the bracket 150 at intervals of 90°, and provided at positions not interfering with any of the sliding grooves 151, the lock members 160 and the locking cylinders 165.

The first air passages 158 axially extend in the bracket 150. The hollow shaft 170 located above the bracket 150 is formed with second air passages 172 coupled to the first air passages 158. The second air passages 172 axially extends in the hollow shaft 170.

Therefore, the air fed from the rotary joint 145 to the first air passages 158 in the bracket 150 through the interior of the hollow portion 115 (outside of the air pipe 119) passes through the air passage 172 in the hollow shaft 170 and supplied to the interior of the tire T sandwiched between the rims 10 and 20.

The air fed from the rotary joint 145 through the air pipe 119 reaches a cavity 117 formed in the bracket 150. The air passes through communicating holes 117a (formed at positions where they do not interfere with the first air passages 158) extending from the cavity 117 to the outer peripheral surface of the bracket 150. At the outlet of respective communicating hole 117, provided are a joint and an air pipe (both are not shown), from which the air is supplied to the locking cylinder 165 (FIG. 4).

In this embodiment, as the air passages 158 are disposed at the positions where they do not interfere with the lock members 160, the sliding grooves 151, and other elements, the air passages 158 can be isolated from an environment where fine particles are easily produced. Thereby, it can be prevented for fine particles and the like to enter into the air blown into the tire T.

Hereafter a lock shaft holding and elevating system will be described.

Figure 7:
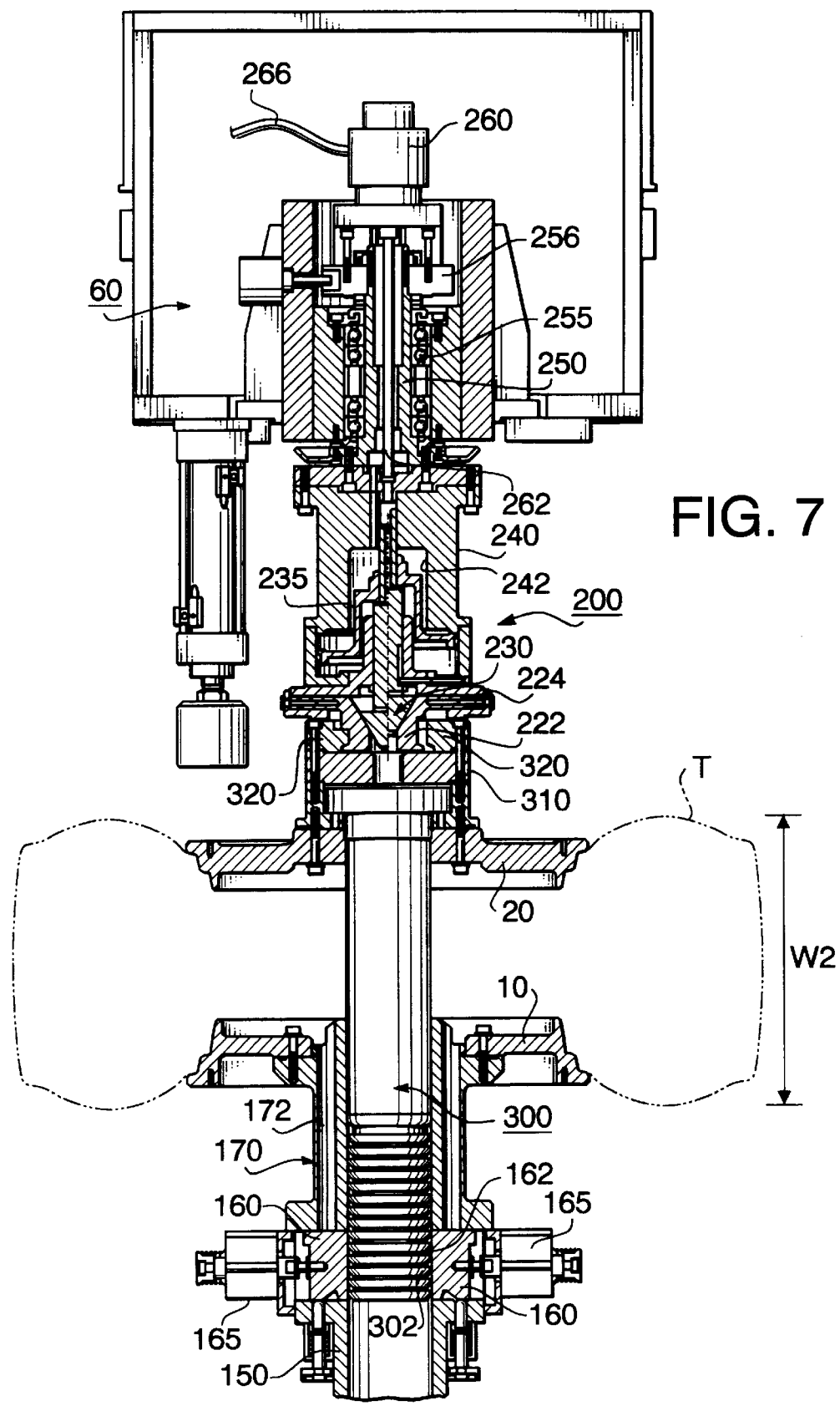
FIG. 7 is a side sectional view of an inserter unit portion of the measuring apparatus shown in FIG. 1.

FIG. 7 is a side sectional view of an inserter unit portion of the apparatus shown in FIG. 1. As shown in FIG. 7, a mounting member 310 for mounting the upper rim 20 onto the lock shaft 300 is provided with a fixing ring 320 engaged with later-described chuck claws 222 from the inside.

As shown in FIG. 3, an inserter unit 200 for inserting (or pulling out) the lock shaft 300 into (from) the spindle 100 by axially elevating the lock shaft 300 is installed in an elevating housing 60 disposed above the roof 54 shown in FIG. 1. The elevating housing 60 is supported so as to be movable vertically by four sets of linear guides 61 and carriages 62 (only one set is shown in FIG. 1), and is driven vertically by a pair of elevating cylinders 65.

As shown in FIG. 7, the inserter unit 200 has an intermediate shaft 240 rotatably supported to follow the rotation of the spindle 100. The intermediate shaft 240 is attached to a rotating shaft 250 rotatably supported by the elevating housing 60 via bearings 255.

Chuck claws 222 internally engaging the fixing ring 320 of the lock shaft 300 are provided at the lower end of the intermediate shaft 240. The chuck claws 222 are urged inward by spring members 224. The intermediate shaft 240 vertically movably holds a chuck driving member 230 having a conical tip that abuts on the tapered surfaces of the chuck claws 222 from above.

The chuck driving member 230 is vertically driven by air pressure. A cavity 242 is formed inside the intermediate shaft 240, and has a diaphragm 235 fixed to the upper end of the chuck driving member 230. An air pipe 262 penetrates the hollow portions inside the rotating shaft 250 and intermediate shaft 240 to supply air to the cavity 242. A rotary joint 260 for supplying air to the air pipe 262 is provided at the upper end of the rotating shaft 250, and has connected thereto an air hose 266 coupled to an air supply source (not shown).

With this constitution, when air is supplied from the rotary joint 260 to increase the internal pressure, the chuck driving member 230 lowers. This operation causes the chuck claws 222 to move outward against the biasing force of the spring members 224 to engage the fixing ring 32. On the other hand, when air is discharged from the rotary joint 260 to reduce the internal pressure of the cavity 242, the chuck driving member 230 elevates. This operation causes the chuck claws 222 to move inward due to the biasing force of the spring members 224 to release the fixing ring 320 from locking effected by the chuck claws 222. FIG. 7 shows both states in which the chuck claws 222 lock the fixing ring 320 (on the left half side), and in which locking is released (on the right half side).

Thus, when air is supplied from the rotary joint 260, the chuck claws 222 chuck the fixing ring 320 of the lock shaft 300 (inserted into the spindle 100). When the spindle 100 is then rotated, the rotating shaft 250 and intermediate shaft 240 follow this rotation.

As shown in FIG. 1, step-like regulating members 70 for regulating the vertical position of the lock shaft 300 are provided on the roof 54. The regulating member 70 is constituted to slide on a guide rail 71 disposed on the roof 54, and is moved along the rail 71 by a ball spring mechanism 74 driven by a motor 72 via a belt 73. The elevating housing 60 includes elevating stoppers 68 (FIG. 2), each of which abuts on the step portion of the regulating member 70 from above.

The measuring apparatus 1 constituted as described above holds the tire T as described below.

First, air is supplied from the rotary joint 260 to cause the chuck claws 222 to chuck the lock shaft 300, and the elevating cylinder 65 is driven to elevate the elevating housing 60 in order to pull the lock shaft 300 out of the spindle 100. Then, the tire T is set on the lower rim 10, and the motor 72 is driven to move the regulating members 70 to appropriate positions. The elevating cylinders 65 are driven again to lower the elevating housing 60 until the elevating stoppers 68 abut on the regulating members 70. When the elevating stoppers 68 abut on the regulating members 70, the lock cylinders 165 are turned on to engage the lock members 160 with the lock shaft 300 again.

When six locking pawls 162 of the locking member 160 engage a portion up to the sixth stage counted from the top stage of 15-stage locking flutes 302 of the locking shaft 300 as shown in FIG. 3, the width of a tire pinched between the upper rim 20 and the lower rim 10 is the minimum value W1. In contrast, when six locking pawls 162 of the locking member 160 engage a portion up to the sixth stage counted from the bottom stage of the locking flutes 302 of the locking shaft 300 as shown in FIG. 7, the width of the tire pinched between the upper rim 20 and the lower rim 10 is the maximum value W2.

By selecting which locking flutes 302 of the locking shaft 300 the locking pawls 162 of the locking ember 160 engage in this way, it is possible to cope with a plurality of widths (nine widths in this embodiment) of tires between the minimum width W1 and the maximum width W2.

Figure 8:
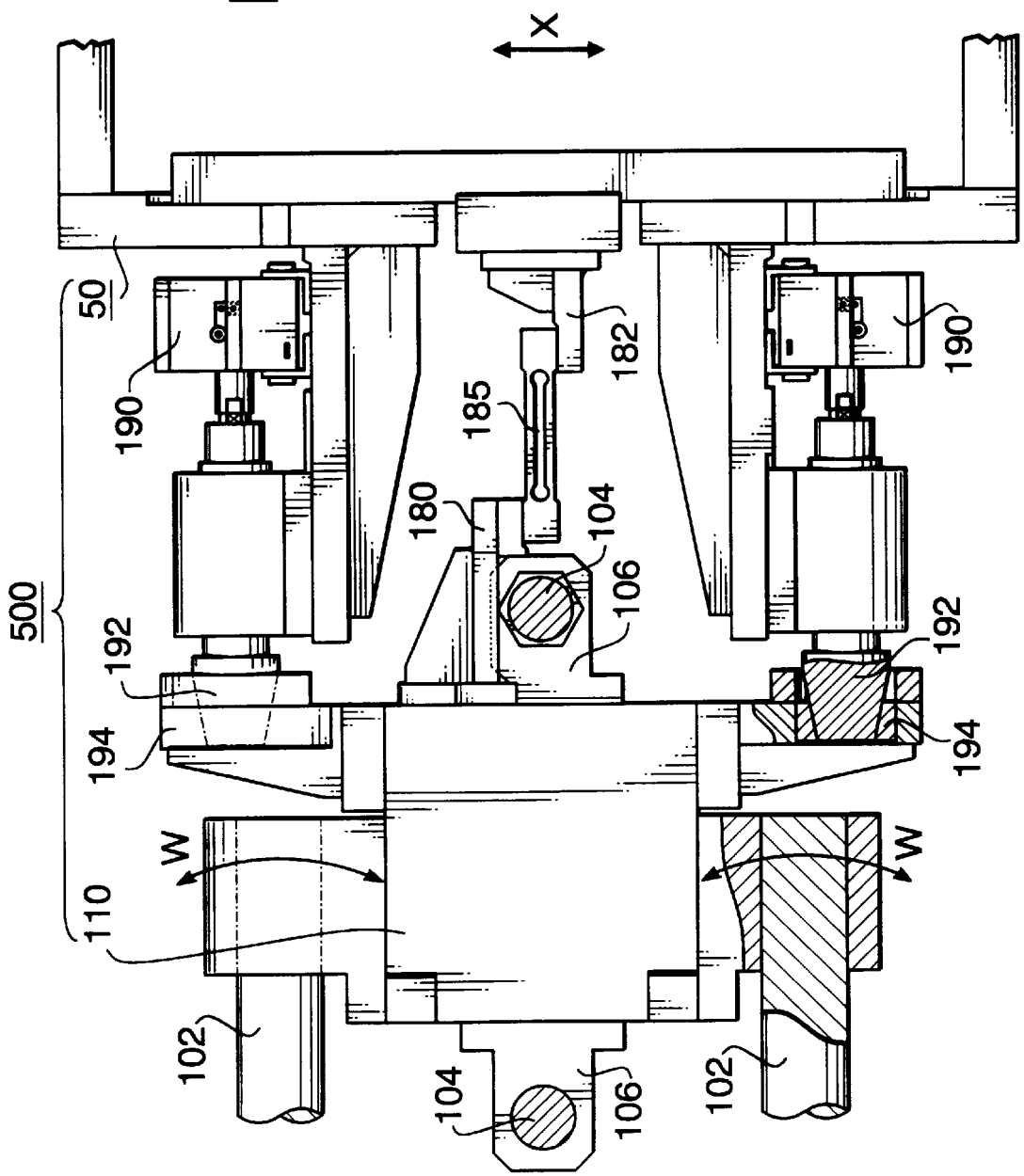
FIG. 8 is a sectional view taken along the line A–A' in FIG. 1 for illustrating a spindle support structure.

FIG. 8 is a sectional view taken along the line A–A' in FIG. 1 for illustrating a spindle support structure.

As shown in FIGS. 1 and 8, the spindle housing 110 is mounted on the base 50 via bar springs 102 extending in the horizontal direction and is supported by bar members 104 suspended from the base 50 in the vertical direction. The bar springs 102 can be elastically deformed in the deflecting direction shown as "W" in the FIG. 8, and the spindle housing 110 can vibrate in the direction referred to as "X" in FIG. 8, within a surface crossing the central axis of the spindle 100.

In order to detect vibration in the X direction occurring when the spindle 100 is rotated with the tire T mounted, a mounting bar 180 extending perpendicularly to both the X direction and the axial direction of the spindle 100 is attached to the spindle housing 110. In addition, a mounting bar 182 extends from the base 50 and opposite to the mounting bar 180. A load cell 185 that detects the load effected in the X direction is sandwiched between the two mounting bars 180 and 182.

During a uniformity measurement, as a large load is effected on the spindle shaft 120, the spindle housing 110 must be prevented from vibrating. Thus, as shown in FIG. 8, pressing members 192 each having a conical tip are provided on the base 50, and a pair of tapered recessed portions 194, each of which receives the pressing member 192, are formed on the spindle housing 110. The pressing member 192 is driven by a vibration regulating cylinder 190.

That is, during a uniformity measurement, the vibration regulating cylinder 190 is turned on to press the pressing member 192 against the recessed portion 194 in order to prevent the spindle housing 110 from vibrating. On the other hand, during a dynamic-balance meaurement, the vibration regulating cylinder 190 is turned off to release the pressing member 192 from the recessed portion 194 in order to allow the spindle housing 110 to vibrate in the X direction.

In addition, during a uniformity measurement, as shown in FIG. 7, the chuck claws 222 engage the fixing ring 320 of the lock shaft 300. That is, the top and bottom (the spindle 100 side and inserter unit 200 side, respectively) of the tire are firmly held so that the tire T can withstand the load effected when the rotating drum 30 is pressed against it. On the other hand, during a dynamic-balance measurement, chucking executed by the chuck claws 222 is released to allow the spindle housing 110 to vibrate in the X direction.

In order to conduct a dynamic-balance measurement, air is supplied to the inside of the tire T held between the lower and upper rims 10 and 20 to inflate it and then rotates the spindle 100 to detect a variation in load effected on the load cell 185 during the rotation of the spindle 100. The method for calculating dynamic balance based on the detected variation of the load is well known, so its description is omitted. The measuring apparatus 1 calculates which portion of the tire T a balance weight is to be placed, based on the result of the calculation of dynamic balance, and uses a marking device (not shown) to mark this portion.

The uniformity measurement uses a rotating drum 30 (see FIGS. 1 and 2). The rotating drum 30 is mounted in a movable housing 32 that can slide on rails 31 extending in a direction in which the drum 30 approaches and moves away from the tire T, and is moved by a rack pinion mechanism 35 (a pinion 36 and a rack 38) that is driven by a motor 34 (FIG. 2). In addition, load cells 33 are attached to a rotating shaft of the rotating drum 30 to detect a reaction force applied in the radial direction and thrust direction by the tire T to the rotating drum 30.

During a uniformity measurement, the control section (not shown) of the measuring apparatus 1 drives the motor 34 to press the rotating drum 30 against the tire T. Then, a variation in load effected on the load cell 33 is detected during the rotation of the spindle 100.

As above, the measuring apparatus 1 according to this embodiment enables a single apparatus to measure both uniformity and dynamic balance of a tested tire.

The present disclosure relates to subject matters contained in Japanese Patent Applications No. HEI 9-363399 filed on Dec. 16, 1997, No. HEI 10-39632 filed on Feb. 5, 1998 and No. HEI 10-39633 filed on Feb. 5, 1988, which are expressly incorporated herein by reference in their entireties.

What is claimed is:

1. A measuring apparatus for the uniformity and the dynamic-balance of a tire, which comprises:

a supporting member which is rotated while supporting a tested tire;

a holding member which holds said supporting member while allowing it to vibrate during rotation thereof; and a regulating system which prevents the vibration of said supporting member during rotation thereof, wherein the vibration of the supporting member is prevented by said regulating system during a uniformity measurement.

2. The measuring apparatus according to claim 1, which further comprises a rotary drum arranged to be pressed against the circumferential surface of the tested tire during a uniformity measurement.

3. The meauring apparatus according to claim 1, which further comprises a frame member, and wherein said holding member comprises a housing which rotatably holds said supporting member, and a plurality of elastic members provided between said housing and said frame member for supporting said housing.

4. The measuring apparatus according to claim 3, wherein said regulating system comprises a coupling member supported by said frame member to be movable between operative and inoperative positions, said coupling member firmly coupling said housing to said frame member at the operative position, and wherein said coupling member is moved to the operative position during a uniformity measurement.

5. The measuring apparatus according to claim 4, wherein said regulating system further comprises:

a rotatable shaft member supported by said frame member and disposed on the extension of the rotary axis of said supporting member; and a chuck mechanism provided at one end of said rotatable shaft member for chucking said supporting member at the side opposite to said holding member across said tire, said chuck mechanism chucking said supporting member during a uniformity measurment so as to connect said supporting member to said rotatable shaft member.

6. The measuring apparatus according to claim 1, wherein said supporting member comprises:

a rotatable spindle having a first rim and an axially extending hollow portion;

a locking shaft having a second rim, said locking shaft being inserted into said hollow portion of the spindle so that the tested tire is pinched between said first and second rims; and a locking system which firmly locks the locking shaft to said rotatable spindle, the axial distance between said first and second rims being changed by shifting the position of the locking shaft relative to said rotatable spindle to be locked by s aid locking system.

7. The measuring apparatus according to claim 6, wherein said locking system comprises:

a plurality of engaging steps formed on the outer circumferential surface of said locking shaft and arranged in the axial direction thereof; and at least one lock member provided on said spindle to be movable in the direction perpendicular to the axial direction of said spindle, said lock member being provided with engaging steps to be meshed with the engaging steps of said locking shaft to lock said locking shaft to said spindle when said lock member is moved to abut against the locking shaft.

8. The measuring apparatus according to claim 7, wherein a plurarity of lock members are provided and arranged radially at the interval of a predetermined angle about the axis of said spindle.

9. The measuring apparatus according to claim 8, which further comprises an air passage system provided in said spindle for supplying air into said tire held between said first and second rims, said air passage system being formed to be isolated from the portion of said spindle where said lock shaft is to be inserted and to pass the intervals among said plurality of lock members.

10. The measuring apparatus according to claim 6, which further comprises an air passage system provided in said spindle for supplying air into said tire held between said first and second rims, said air passage system being formed to be isolated from the portion of said spindle where said lock shaft is to be inserted and from said locking system.

* * * * *